2,855,961
VALVE MECHANISM

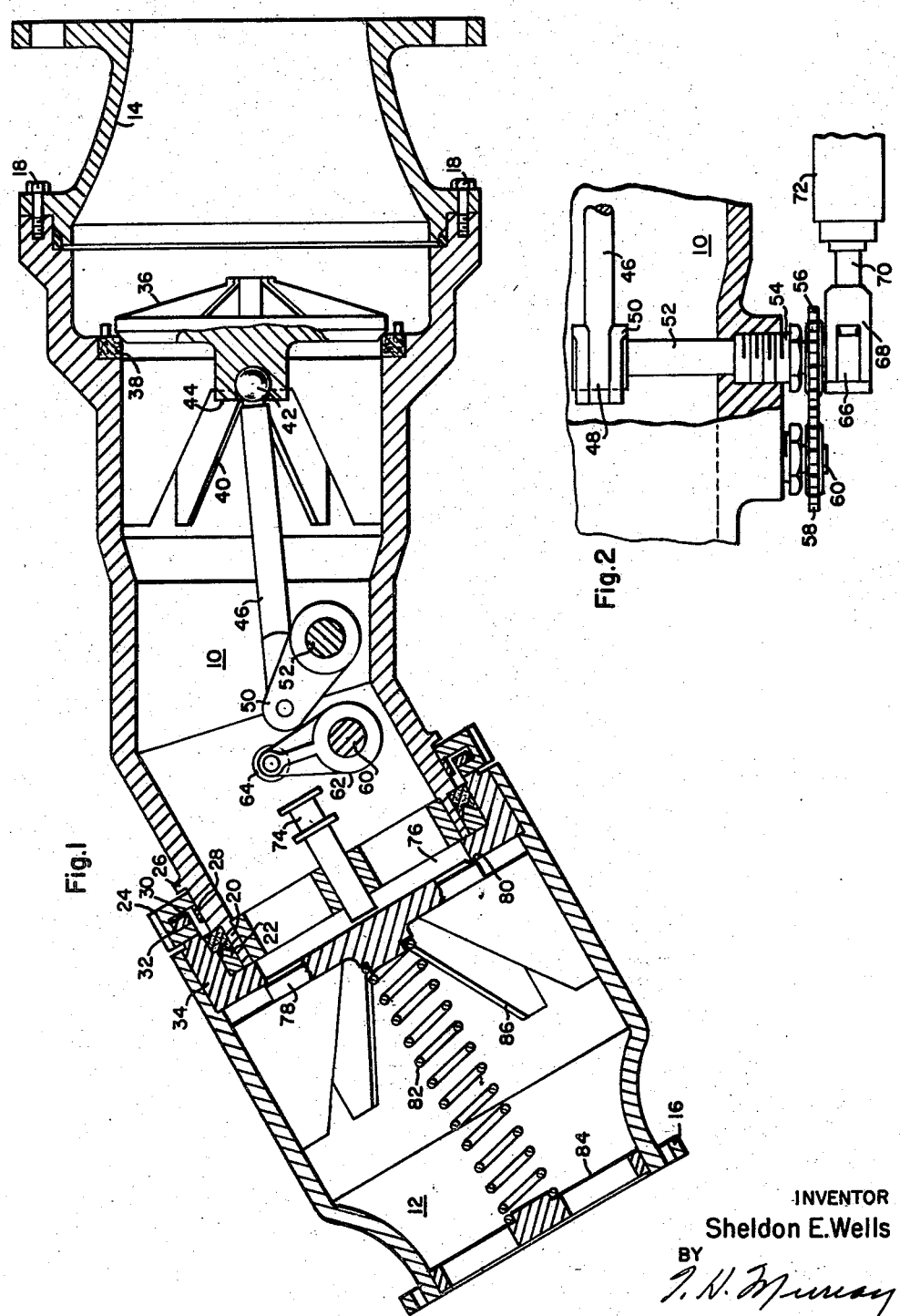
Oct. 14, 1958     S. E. WELLS     2,855,961
VALVE MECHANISM
Filed Nov. 6, 1956
INVENTOR
Sheldon E. Wells United States Patent Office 2,855,961
Patented Oct. 14, 1958

Sheldon E. Wells, Youngstown, Ohio, assignor to Lombard Corporation, Youngstown, Ohio, a corporation of Ohio Application November 6, 1956, Serial No. 620,620

3 Claims. (Cl. 141—346)

This invention relates to devices for filling or evacuating receptacles with fluid from a supply tank and more particularly to a separable two-part valve for filling receptacles in which the parts, when separated, form seals for the receptacle and supply tank respectively.

Although not limited thereto, the present invention is particularly adapted for use in filling or evacuating a chamber in a transportable device with a fluid such as oxygen. In applications of this sort it is necessary at all times to prevent the chamber from being exposed to the atmosphere so that the oxygen in the chamber will be as pure as possible. In addition, some means must be provided for conveying oxygen between a supply tank and the chamber. This conveying means must be separable so that the transportable device may be detached from the supply tank.

It is a primary object of this invention to provide a new and improved receptacle filling device.

More specifically, it is an object of the invention to provide a receptacle filling device which meets all of the requirements enumerated above.

A still further object of the invention lies in the provision of a receptacle filling or evacuating device which may be controlled by a single integral control means.

The above and other objects of the invention will become readily apparent from the following detailed description taken in connection with the accompanying drawings which form a part of this invention and in which:

Figure 1 is a cross-sectional view of the invention; and

Fig. 2 is a broken-away top view of the valve actuating and synchronizing mechanism of the invention.

Referring to Fig. 1, the invention is made up of two housings or passageways 10 and 12. The housing 10 is adapted for connection to an oxygen supply tank or the like at a pressure of 3000 p. s. i. or more so that fluid from the supply tank feeds into the necked-down flanged portion 14 of housing 10; whereas housing 12 is adapted for connection to a receptacle in a transportable device by means of bolts, not shown, which extend through flange 16. Necked-down portion 14 is secured to the main portion of housing 10 by means of cap screws 18.

As will be understood, the housings 10 and 12 are permanently and securely fastened to the supply tank and transportable device, respectively, so as to become integral parts thereof.

In order to disengage the housings and permit the supply tank and transportable device to be separated, the open end of housing 10 is machined at 20 to provide a reduced-diameter extension which slides into a valve packing gland 22 on the open end of housing 12. A spanner nut 24 rides on the outer periphery of housing 10 between a flange 26 on the housing body and a retainer ring 28 which may be brazed or threaded onto the assembly. For quick connect and disconnect, the nut 24 is provided with a series of L slots 30 which allow the nut to be slipped over a similar number of matching dogs 32 formed in an annular member 34 which fits into the open end of housing 12. In this manner, a small angular throw of a spanner wrench tightly assembles the two housings 10 and 12.

Within housing 10 there is provided a globe disc type valve member 36 which is adapted to engage with an annular valve seat 38. The valve member is guided within housing 10 by a spider arrangement of wings 40 and is provided with a spherical socket 42 and retainer plate 44 to form a ball joint connection for an operating push rod 46. As shown in Figs. 1 and 2, the opposite end of the push rod has a male clevis fitting 48 which is pivotally connected between the legs of a clevis-type crank 50. The crank is, in turn, mounted on a torque rod 52 which passes through a packing gland arrangement 54 in one wall of housing 10 as shown. The external end of the torque rod 52 carries a synchronizing gear 56 which meshes with a synchronizing gear 58 on a similar torque rod 60. As shown in Fig. 1, the torque rod 60 carries a second crank 62 which has a circular cam 64 mounted on its outer end. On the extreme outer end of torque rod 52 is mounted another crank 66 which engages with a clevis 68 carried on the forward end of the piston rod 70 of a double-acting fluid motor 72. As will be understood, when the fluid motor 72 is pressurized, torque rods 52 and 60 will be forced to rotate in opposite directions in synchronism, the direction of rotation depending upon the sense in which double-acting fluid motor 72 is pressurized.

Cam 64 on crank 62 is adapted to engage the end of a tappet 74 which is carried within a bore provided in a spider ring 76 located within the open end of housing 10. The other end of tappet 74 is adapted to engage a second globe disc type valve member 78 which is normally urged into engagement with a valve seat 80 on annular member 34 by a coil spring 82. The other end of the coil spring abuts against a second spider ring 84 as shown. Valve member 78 is also guided within housing 12 by a spider arrangement of wings 86.

In operation, when the two housings are separated, the receptacle carrying housing 12 is free to be transported. Spring 82 will force valve member 78 to act as a check valve. Of course, any pressure within the receptacle will aid in forcing valve member 78 against its associated seat 80. Cranks 50 and 62 will be in the positions shown so that valve member 36 will be forced against seat 38 and fluid under pressure will be retained within the supply tank.

When it is desired to transfer fluid from the supply tank to the transportable receptacle, the machined portion 20 of housing 10 is inserted into packing gland 22 in housing 12. The spanner nut 24 is adjusted to slide over the dogs 32 and is then turned to securely fasten together the two housings 10 and 12. The pressure of the fluid in the supply tank provides thrust in excess of that required to motivate the valve actuating system illustrated. When the operator pressurizes the fluid motor 72 to open the valve, crank 50 will rotate in a clockwise direction as shown in Fig. 1 while crank 62 will rotate in a counter-clockwise direction in synchronism with crank 52. Valve member 36 is immediately unseated by virtue of the fact that its linkage to crank 50 is a pin and ball arrangement. Valve member 78, however, is not immediately opened since there is a clearance between cam 64 and tappet 74 as shown. As the cranks 50 and 62 continue rotating, valve member 78 will be unseated also, but its total stroke will be less than that of valve member 36. This should not impair the flow on the filling operation since valve member 78 acts as a check valve opening its full stroke as a result of flow and pressure. At the completion of the filling operation, the fluid motor 72 will be pressurized in the opposite sense to rotate the cranks 50 and 62 into the positions shown in Fig. 1 whereby the valve members will again be seated. Spanner nut 24 is then rotated and the housings 10 and 12 are separated, allowing the fluid entrapped between the valve members to escape.

If it is desired to evacuate the receptacle in the transportable device, the process described above is repeated, but now fluid flows from housing 12 to housing 10. Valve member 78 is prevented from closing during evacuation by virtue of the fact that cam 64 engages tappet 74.

Although the invention has been described in connection with a certain specific embodiment, it will be readily apparent to those skilled in the art that various changes in form and arrangement of parts may be made to suit requirements without departing from the spirit and scope of the invention.

I claim as my invention:

1. Apparatus for conducting fluid under pressure from one container to another comprising, in combination, a first open-ended passageway communicating with the interior of said one container, a second open-ended passageway communicating with the interior of the other container, means for securely fastening together the open ends of said passageways whereby fluid under pressure in one container may be conducted to the other container through said passageways, a valve seat in one of said passageways, a first valve member engageable with said valve seat and movable therefrom in a direction away from the open end of said one passageway, yieldable means urging said first valve member against its associated valve seat, a valve seat in the other of said passageways, a second valve member engageable with the valve seat in said other passageway and movable therefrom in a direction away from the open end of said other passageway, a tappet member carried within said other passageway and adapted to disengage said first valve member from its associated seat, a first element pivotally carried within one of said passageways, a linkage connecting the free end of said pivoted element to said second valve member whereby movement of the pivoted element in one direction will disengage said second valve member from its associated seat, a second element pivotally carried within one of said passageways to engage said tappet member and disengage said first valve member from its associated seat, said second element being spaced from said tappet member whereby said first element and linkage will disengage said second valve member before the tappet and second element disengage said first valve member, and gearing means interconnecting said pivoted elements whereby the elements will rotate in opposite directions to disengage the first and second valve members from their associated valve seats.

2. Apparatus for conducting a fluid from one container to another comprising, in combination, a first open-ended passageway communicating with the interior of one of said containers, a second open-ended passageway communicating with the interior of the other of said containers, means for securely fastening together the open ends of said passageways whereby fluid in one container may flow to the other through said passageways, a valve seat in one of said passageways, a first valve member engageable with said valve seat, a valve seat in the other of said passageways, a second valve member engageable with the valve seat in said other passageway, a pair of elements pivotally carried between said first and second valve members, a linkage connecting the free end of one of said elements to one of said valve members whereby movement of said one element in one direction will disengage said one valve member from its associated seat, a tappet member spaced from the other of said elements and positioned between said valve members to be engaged by the free end of the other of said elements for disengaging the other of said valve members from its associated valve seat upon movement of the other element in one direction, and means interconnecting said first and second pivoted elements whereby the elements will rotate in substantial synchronism, the spacing between said tappet member and said other element being such that said linkage and said one element will disengage said one valve member before said other element and said tappet member will disengage said other valve member.

3. In apparatus of the type described, a first container, a second container, a passageway interconnecting said containers whereby fluid in one container may flow through said passageway to the other container, first and second valve seats spaced within the passageway, a valve member associated with each of said valve seats and engageable therewith, a pair of elements pivotally carried within said passageway between said valve members, a linkage operatively connecting one of said elements to one of said valve members, a tappet member operatively connected to the other valve member and spaced from the other of said elements, and means for moving said elements about their pivots in synchronism to disengage said valve members from their associated valve seats, the spacing between said tappet member and said other element being such that said linkage and said one element will disengage said one valve member before the tappet member and the other element will disengage said other valve member.

References Cited in the file of this patent

UNITED STATES PATENTS 2,649,109  Samiran _____ Aug. 18, 1953